United States Patent [19]
Ellis et al.

[11] Patent Number: 5,590,904
[45] Date of Patent: Jan. 7, 1997

[54] DUAL RESISTANCE SWITCH FOR BUCKLE CONFIRMATION

[75] Inventors: Robert P. Ellis, Almont; Robert E. Nill, Royal Oak; Leon P. Niedzwiecki, Romeo, all of Mich.

[73] Assignee: TRW Vehicle Safety Systems Inc., Lyndhurst, Ohio

[21] Appl. No.: 515,131

[22] Filed: Aug. 15, 1995

[51] Int. Cl.$^6$ ............................ B60R 21/32; B60R 22/46; B60R 22/48

[52] U.S. Cl. ........................... 280/735; 280/806; 180/268; 340/457.1; 200/61.58 B

[58] Field of Search .................................. 180/268, 269, 180/270; 280/735, 734, 728.1, 806, 801.1; 200/61.58 B; 340/457.1, 438

[56] References Cited

U.S. PATENT DOCUMENTS

| | | | |
|---|---|---|---|
| 3,438,455 | 4/1969 | Redmond | 180/269 |
| 3,897,081 | 7/1975 | Lewis | 280/735 |
| 3,934,671 | 1/1976 | Hart | 180/270 |
| 4,984,651 | 1/1991 | Grösch et al. | 180/268 |
| 5,067,212 | 11/1991 | Ellis | 24/642 |
| 5,338,063 | 8/1994 | Takeuchi et al. | 280/735 |
| 5,411,289 | 5/1995 | Smith et al. | 280/735 |
| 5,413,378 | 5/1995 | Steffens, Jr. et al. | 180/268 |

FOREIGN PATENT DOCUMENTS 0141734  5/1985  European Pat. Off. .

Primary Examiner—Brian L. Johnson
Assistant Examiner—Peter C. English
Attorney, Agent, or Firm—Tarolli, Sundheim, Covell, Tummino & Szabo

[57] ABSTRACT

A vehicle occupant restraint system (20) includes an inflatable air bag (41) and an actuatable inflator (40) for, upon actuation, providing inflation fluid for inflating the air bag. A seat belt (105) extends across the vehicle occupant to restrain the occupant. A tongue (110) is connected with the seat belt (105), and a buckle (57) receives and latches the tongue (110) in the buckle (57). A pretensioner (44) is operatively connected to the belt (105). An indicator (59) indicates to the occupant if the tongue (110) is not received in the buckle (57). A seat belt buckle switch (66) is operatively connected to the buckle (57). The seat belt buckle switch (66) has electrically conductive normally closed contacts (74, 76) which open upon insertion of the tongue (110) into the buckle (57). A resistor network is electrically connected to the normally closed contacts (74, 76). The resistor network provides a first electrical signal having a first characteristic when the normally closed contacts (74, 76) are closed and a second electrical signal having a second characteristic when the normally closed contacts (74, 76) are open. A controller (24) is operatively connected to the inflator (40), the pretensioner (44), the resistor network (60, 72) and the indicator (59). The controller (24) controls actuation of the inflator (40), the pretensioner (44) and the indicator (59) in accordance with the first and second electrical signals.

8 Claims, 5 Drawing Sheets

5,590,904

DUAL RESISTANCE SWITCH FOR BUCKLE CONFIRMATION

TECHNICAL FIELD

The present invention relates to a vehicle occupant restraint apparatus, and particularly to an apparatus for providing a signal indicative of whether a seat belt buckle has received a seat belt tongue.

BACKGROUND OF THE INVENTION

Vehicle occupant restraints include seat belts and actuatable occupant protection devices, such as air bags and seat belt pretensioners. The actuatable occupant protection devices are typically actuated in response to the vehicle experiencing deceleration above a predetermined deceleration. During a vehicle collision, for example, a controller in an occupant restraint system may determine which actuatable occupant protection devices are to be actuated. If an actuatable occupant protection device is to be actuated, the controller controls the actuation of the actuatable occupant protection device.

Actuation of an actuatable occupant protection device may further be controlled in accordance with a signal indicative of occupant usage of seat belts. If the seat belt is restraining the occupant, the air bag may be deployed differently than if the seat belt is not restraining the occupant. Also, when an occupant's seat belt is unbuckled, it is not necessary to deploy the seat belt pretensioner. Therefore, it is desirable to provide a signal indicative of whether the seat belt is buckled or unbuckled to the system controller. It is also desirable to provide a signal indicative of whether the seat belt is buckled or unbuckled to an indicator observable by the vehicle occupant to alert the occupant as to the status of the seat belt, i.e. buckled or unbuckled.

SUMMARY OF THE INVENTION

The present invention is directed to an apparatus for restraining a vehicle occupant. The apparatus includes an inflatable air bag and an actuatable inflator for, upon actuation, providing inflation fluid for inflating the air bag. The apparatus further includes a seat belt which extends across the vehicle occupant. A tongue is connected with the seat belt, and a buckle receives and latches the tongue in the buckle. A pretensioner is operatively connected to the seat belt. An indicator indicates to the occupant if the tongue is not received in the buckle. A seat belt buckle switch is operatively connected to the buckle. The seat belt buckle switch has electrically conductive normally closed contacts which open upon insertion of the tongue into the buckle. A resistor network is electrically connected to the normally closed contacts. The resistor network provides a first electrical signal having a first characteristic when the normally closed contacts are closed and a second electrical signal having a second characteristic when the normally closed contacts are open. A controller is operatively connected to the inflator, the pretensioner, the resistor network and the indicator. The controller controls actuation of the inflator, the pretensioner and the indicator in accordance with the first and second electrical signals.

The resistor network preferably comprises a first resistor in series with the normally closed contacts of the seat belt buckle switch and a second resistor in parallel with the contacts. The resistor network provides a first electrical signal having a first characteristic dependent upon the resistance value of the first resistor when the contacts are closed and a second electrical signal having a second characteristic dependent upon the resistance values of the first resistor and the second resistor when the contacts are open.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF A PREFERRED EMBODIMENT

Figure 1:
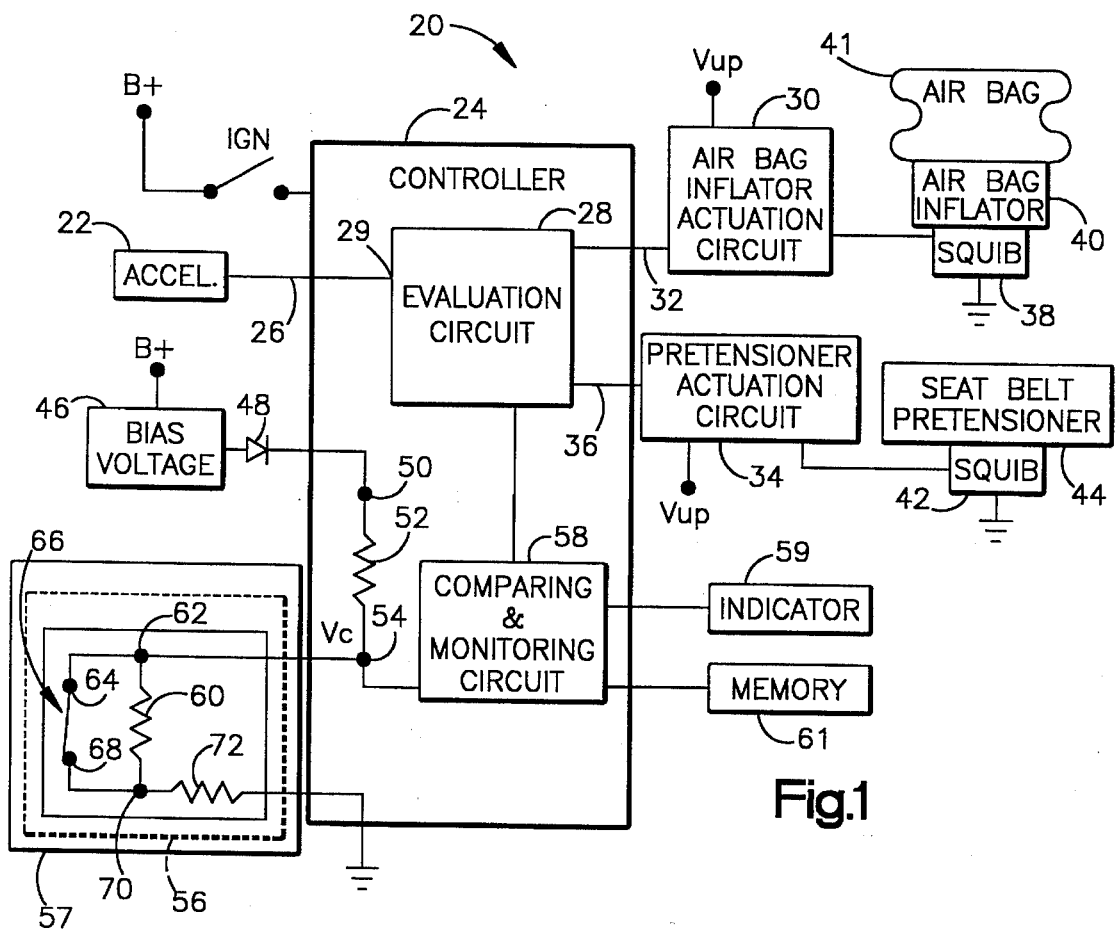
FIG. 1 is a schematic block diagram of an occupant restraint system embodying the present invention.

A vehicle occupant restraint system 20, shown FIG. 1, includes an accelerometer 22, a controller 24, an air bag inflator actuation circuit 30, an actuatable air bag inflator 40, an air bag 41, a pretensioner actuation circuit 34, a pretensioner 44, and a seat belt buckle 57. The seat belt buckle 57 is operably connected to seat belt webbing. The seat belt webbing is anchored to the vehicle. An occupant is restrained when the seat belt webbing extends across the occupant and the seat belt is buckled.

The accelerometer 22 is operatively mounted to the vehicle. The accelerometer 22 senses crash acceleration and is electrically connected to the controller 24. The accelerometer 22 outputs an electrical signal having a characteristic indicative of the vehicle's crash acceleration on a line 26.

The controller 24 is a microcomputer and is programmed to include an evaluation circuit 28 and a comparing and monitoring circuit 58. The evaluation circuit 28 and comparing and monitoring circuit 58 of the controller 24 may be implemented using software in the microcomputer or with discrete analogue components. The evaluation circuit 28 receives the electrical signal on the line 26 at an input 29. The controller 24 monitors the electrical signal on the line 26 and performs an analysis, in the evaluation circuit 28, on the electrical signal to determine whether a crash event is occurring which requires air bag inflation and/or pretensioner actuation. Any one of a number of known crash algorithms is used by the evaluation circuit 28 to determine the occurrence of the crash event.

The evaluation circuit 28 is connected to (i) the air bag inflator actuation circuit 30 on a line 32, and (ii) the pretensioner actuation circuit 34 on a line 36. The air bag inflator actuation circuit 30 is electrically connected to a squib 38 located between a source of electrical energy $V_{up}$ and electrical ground. The squib 38 is operatively connected to the air bag inflator 40. When the evaluation circuit 28 determines that an air bag should be inflated, an actuation signal is provided on line 32. The electrical path from the source of electric power $V_{up}$ through the squib 38 to ground is completed and a sufficient amount of electric current passes through the squib 38 for a sufficient time duration to ignite the squib 38. When the squib 38 is ignited, the inflator 40 is actuated to effect inflation of the air bag 41.

The pretensioner actuation circuit 34 is electrically connected to a squib 42 located between a source of electrical energy $V_{up}$ and electrical ground. The squib 42 is operatively connected to a seat belt pretensioner 44. When the evaluation circuit 28 determines that the pretensioner should be actuated, an actuation signal is provided on the line 36. The electrical path from the source of electric power $V_{up}$ through the squib 42 to ground is completed and a sufficient amount of electric current passes through the squib 42 for a sufficient time duration to ignite the squib 42. When the squib 42 is ignited, the seat belt pretensioner 44 is actuated. The pretensioner, when actuated, pulls the seat belt against the vehicle occupant.

A bias voltage source 46 is connected to the anode of a diode 48. The bias voltage source 46 is preferably a voltage regulator electrically connected to a source of electrical power, such as the vehicle battery B+. The cathode of the diode 48 is connected to a first terminal 50 of a resistor 52. A second terminal of the resistor 52 is connected to a junction 54. The junction 54 is connected to (i) a seat belt buckle switch assembly 56, and (ii) the comparing and monitoring circuit 58 in the controller 24. The comparing and monitoring circuit 58 is electrically connected to (i) an indicator 59, (ii) a memory 61, such as an EEPROM, and (iii) the evaluation circuit 28.

The seat belt buckle switch assembly 56, in accordance with the present invention, is located in a seat belt buckle 57. The seat belt buckle switch assembly 56 includes a resistor 60 having a terminal 62 electrically connected to (i) the controller 24 through the junction 54, and (ii) a first terminal 64 of a normally closed switch 66.

A second terminal 68 of the switch 66 is connected to a second terminal 70 of the resistor 60. A resistor 72 is connected between the terminal 70 and electrical ground. Preferably, the resistor 60 has a resistance value of about 300 ohms and the resistor 72 has a resistance value of about 100 ohms. It will be appreciated that the resistors 60 and 72 may be in a location other than in the switch assembly 56 or the buckle 57. The resistance values of the resistors 60 and 72 are selected to provide predetermined voltage values at the junction 54 for each state of the switch 66, i.e. switch closed or open.

Figure 2:
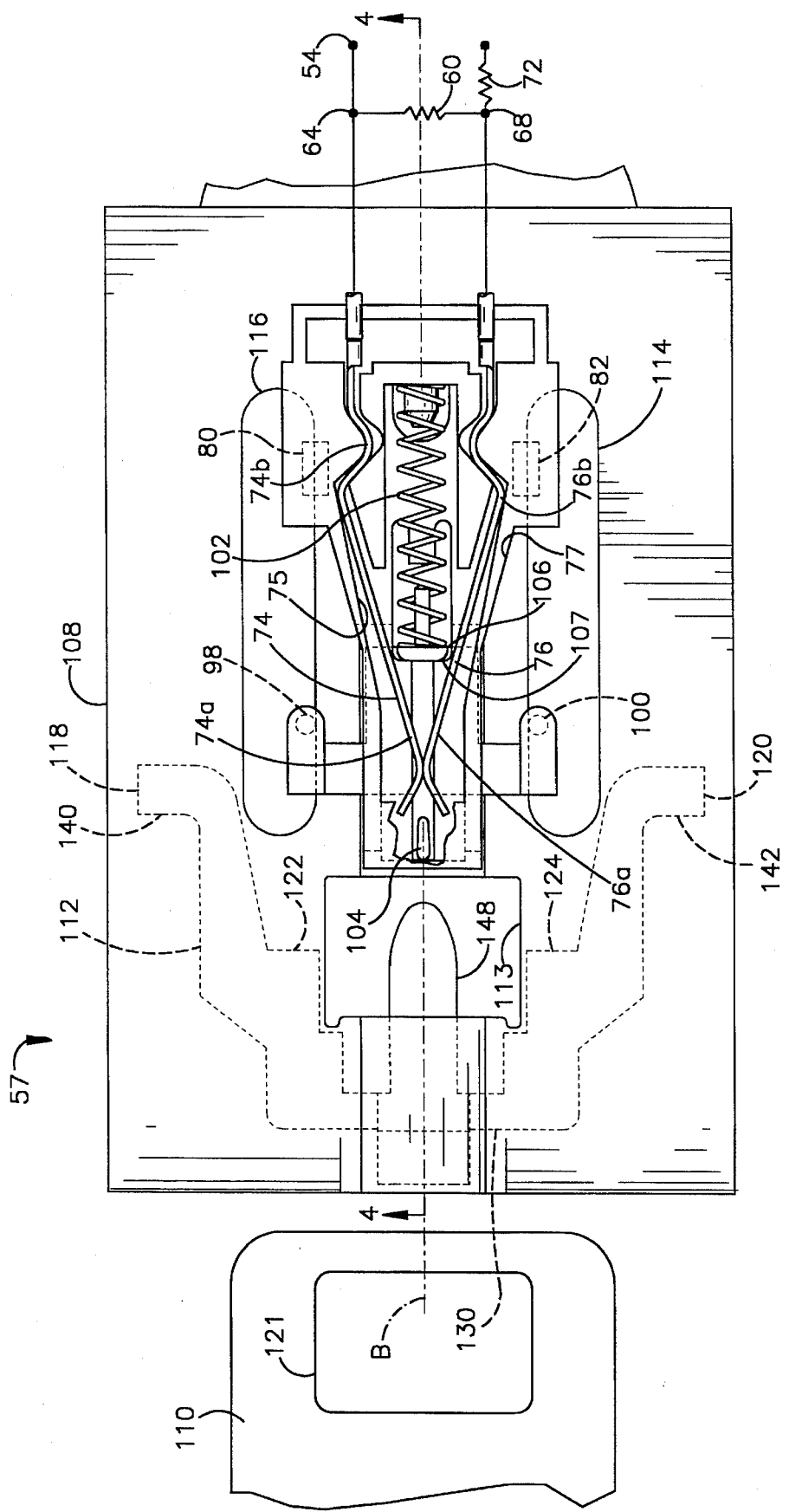
FIG. 2 is a schematic plan view of a seat belt buckle, with parts removed, and a seat belt tongue of the occupant restraint system of FIG. 1.
Figure 4:
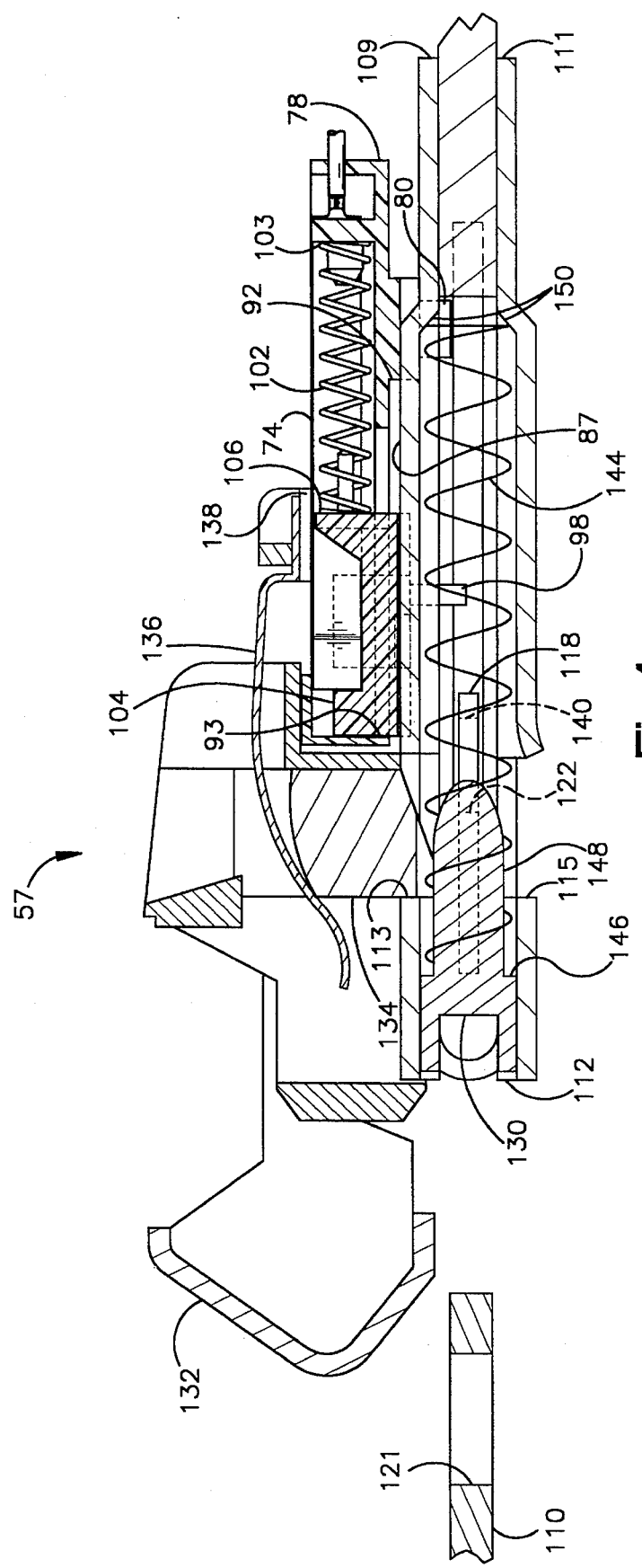
FIG. 4 is a sectional view taken approximately along the line 4—4 in FIG. 2.
Figure 5:
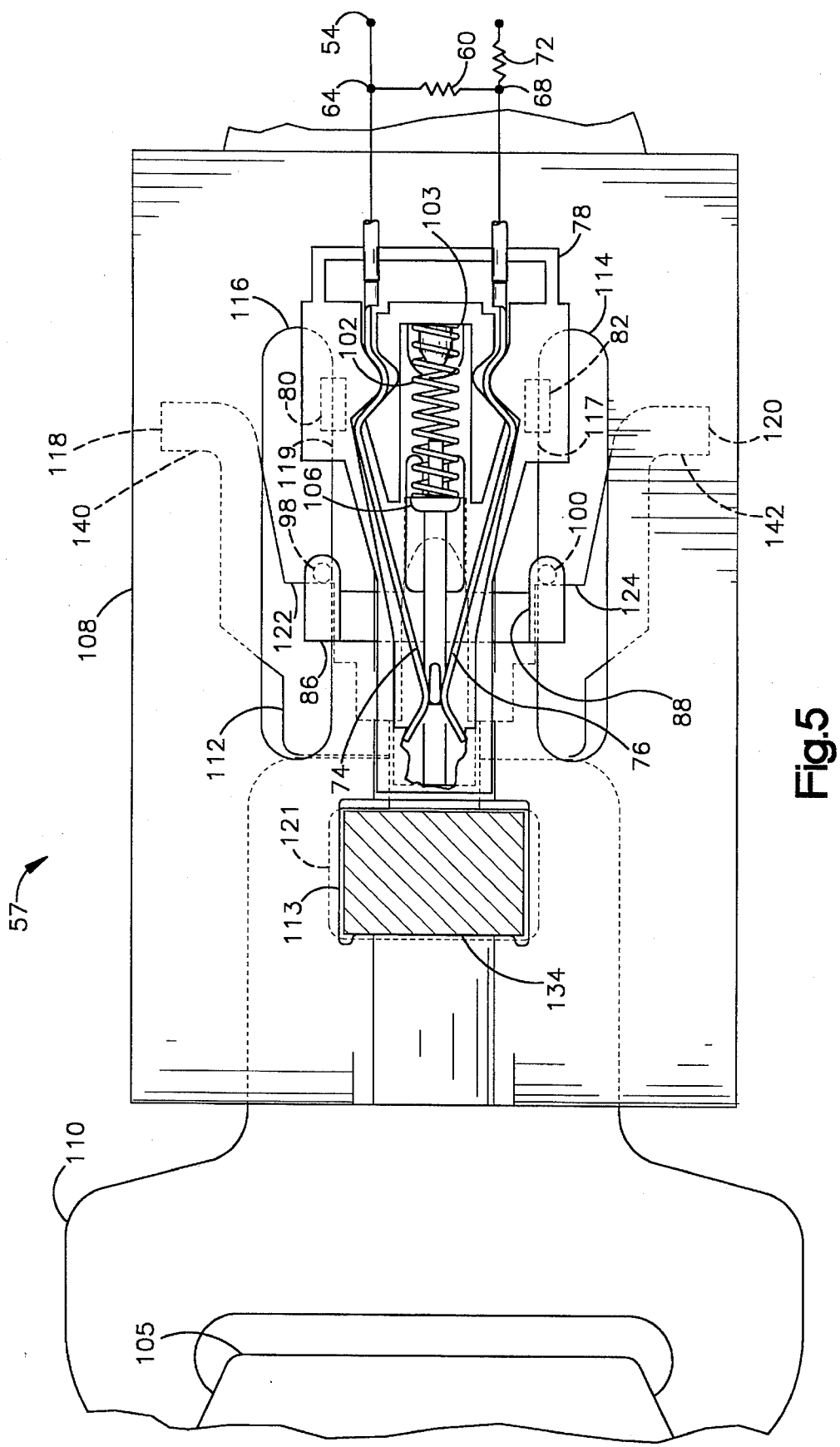
FIG. 5 is a view similar to FIG. 2, illustrating parts in different positions.

Referring to FIGS. 2, 4, and 5, the seat belt buckle 57 comprises a buckle base 108 (shown schematically) which receives a seat belt tongue 110. The tongue 110 is operatively attached to a seat belt 105. The seat belt tongue 110 has a latch opening 121. The base 108 of the buckle 57 has a longitudinal central axis "B". The base 108 includes an upper wall 109 and a lower wall 111, as viewed in FIG. 4. The walls 109 and 111 are substantially parallel to one another. The base 108 has a pair of longitudinal base openings 114 and 116 in the upper wall 109. The openings 114, 116 are laterally spaced equidistant from, and extending in a direction parallel to, axis B. The upper wall 109 also has a latch opening 113 that lies on the axis B. The lower wall 111 similarly has a latch opening 115 that lies on the axis B.

A seat belt ejector 112 is slidably mounted within the base 108 between the walls 109, 111. A pair of ejector guide tabs 118 and 120 extend laterally from the ejector 112. The ejector guide tabs 118, 120 move between the walls 109, 111 of the base 108 in a direction parallel to axis B. The guide tabs 118, 120 guide the movement of the ejector and limit the movement of the ejector 112 by engaging limit stops. The ejector includes a seat belt tongue receiving groove 130 presented toward a tongue receiving opening in the buckle. The ejector 112 also has two slider tab engaging surfaces 122 and 124 that are presented away from the tongue receiving groove 130 in a direction parallel to the axis B.

Referring to FIG. 4, the seat belt buckle 57 further includes a push-button 132, a latch 134, and a leaf spring 136. The push-button 132 is supported by the base 108 for movement relative to the base in opposite directions parallel to the axis B. The ejector 112 has a push-button engaging surface 140 on the guide tab 118 and a push-button engaging surface 142 on the guide tab 120. The surfaces 140 and 142 are presented in the same direction as the tongue receiving groove 130, and the push-button 132 engages the surfaces 140, 142 of the ejector 112 to move the ejector in a direction parallel to the axis B. The leaf spring 136 is fixedly attached to the push-button 132 at a bridge portion 138 and operatively contacts the latch 134. The leaf spring 136 biases the latch 134 for movement in a downward direction as viewed in FIGS. 4 and 6.

One axial end of an ejector spring 144 rests against a radially extending surface 146 of the ejector 112 and encircles a spring guide 148 that extends along the axis B in a direction away from the tongue receiving groove 130. The other axial end of the ejector spring 144 rests against stop surfaces 150 of the base 108. The ejector spring 144 biases the ejector 112 to move in a direction to the left of the base 108, as viewed in FIG. 4. When the seat belt is unbuckled, the ejector spring guide 148 blocks the latch 34 from passing through the lower wall latch opening 115.

Figure 3:
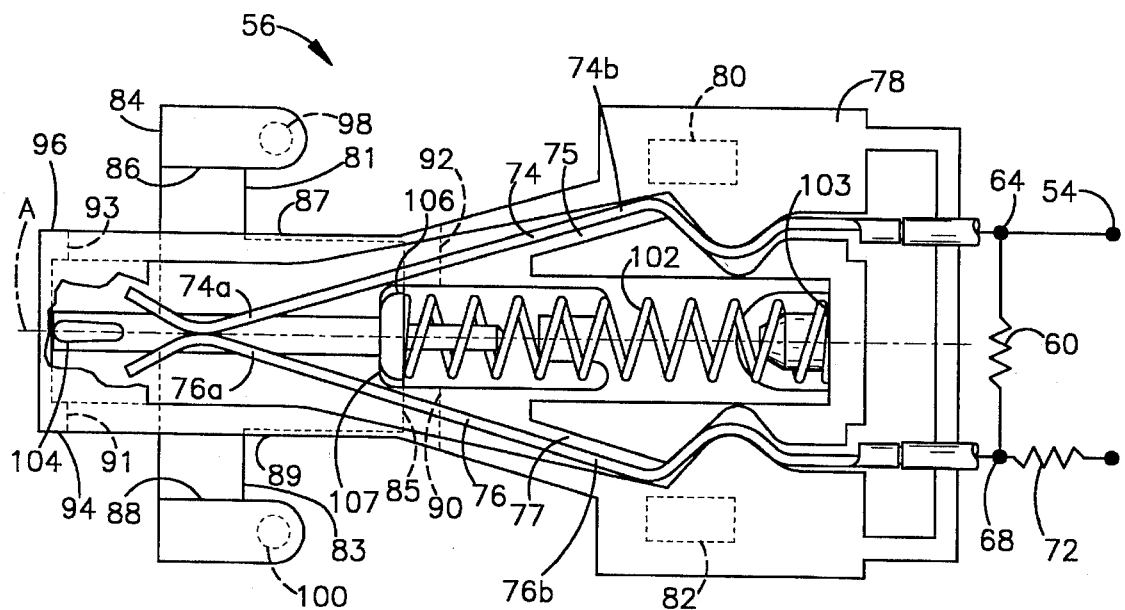
FIG. 3 is a plan view of parts in the seat belt buckle of FIG. 2.

Referring to FIG. 3, the normally closed switch 66 of the seat belt buckle switch assembly 56 includes a pair of elongated, resilient, electrically conductive contacts 74, 76. The elongated contacts 74, 76 have (i) contact arm ends 74a, 76a, and (ii) base ends 74b, 76b. The contacts 74, 76 are mounted in respective cavities 75, 77 in a switch housing 78. The base ends 74b, 76b of contacts 74, 76 engage the walls of the cavities 75, 77 to retain the contacts in the cavities.

The contacts 74, 76 are biased toward engagement and thus are normally closed switch contacts. The contacts 74, 76 are movable in a direction transverse to the axis A and in a direction against the bias to open the contacts, thereby opening the switch. The contact 74 is electrically connected to the terminal 64. The contact 76 is electrically connected to the terminal 68.

The switch housing 78 is supported by the buckle 57. The switch housing 78 has a longitudinal central axis "A". A pair of mounting tabs 80, 82 project from the switch housing 78 and mount the housing to the buckle 57. The mounting tabs 80 and 82 of the switch housing 78 are inserted into the longitudinal base openings 114, 116 of the upper wall 109 to mount the switch 66 to the seat belt buckle by engaging edge surfaces 117 and 119 that partially define the base openings 114, 116, respectively, as shown in FIG. 5.

A slider 84 comprises a generally T-shaped body 85 with a first wing 81 having a wing end 86 and a second wing 83 having a wing end 88. The wing end 86 has an ejector engaging tab 98. The wing end 88 has an ejector engaging tab 100. The ejector engaging tabs 98, 100, of the slider 84, extend through the openings 116, 114 respectively. The slider 84 is made of an electrically insulating material. Each wing end extends parallel and is laterally spaced equidistant from axis A. The wing 81 projects through a longitudinally extending opening 87 in a sidewall 96 of the housing 78. The opening 87 has a first end 92 and a second end 93. The wing 83 projects through a longitudinally extending opening 89 in a sidewall 94 of the housing 78. The opening 89 has a first end 90 and a second end 91.

The slider 84 has a separator 104 extending from the body 85 of the slider 84. The separator 104 is moveable between the contacts 74, 76 for separating the contacts 74, 76, thereby opening the switch.

A coil spring 102 engages the slider 84 at a spring mounting 106 and engages the switch housing 78 at a spring mounting 103. The slider 84 is biased by the spring 102 in a direction toward the second ends 91, 93 of the openings 89, 87 (to the left in FIGS. 2, 4 and 5) such that the separator 104 is not located between contacts 76 and 74 and the switch is closed.

The wings 81, 83 of the slider 84 move in the respective openings 87, 89 in a direction parallel to longitudinal axis A between the first ends 90, 92 and the second ends 91, 93. Surfaces of the housing 78 which define the openings guide the movement of the wings 81, 83. The spring mounting 106 of the slider 84 normally engages an end surface 107 in the housing 78. The end surface 107 limits movement of the slider 84 in a direction to the left, as viewed in FIG. 3.

When the seat belt is unbuckled, the switch 66 is closed, and electrical current flows from the junction 54 through the switch 66 and the resistor 72 to electrical ground. The bias voltage source 46 provides a bias voltage to the junction 54 through the resistor 52. The voltage value $V_c$, at the junction 54, is functionally related to the resistance value of the resistor 72. The comparing and monitoring circuit 58 compares the voltage value $V_c$ to a reference voltage value. When $V_c$ is greater than the reference voltage value, indicating that the switch 66 is closed and the seat belt is unbuckled, a control signal is provided to the evaluation circuit 28 and to the indicator 59. The control signal provided by the controller 24 to the indicator 59 turns the indicator "ON", thereby alerting the vehicle occupant that the seat belt is not buckled. The indicator 59 may be any suitable structure such as a light on the instrument panel of the vehicle.

Upon receipt of the control signal from the comparing and monitoring circuit 58, the evaluation circuit 28 disables the pretensioner actuation circuit 34, thereby preventing unnecessary deployment of the pretensioner 44 when the seat belt is not buckled. When the vehicle is involved in a collision, the pretensioner actuation circuit 34 is disabled if the seat belt is not buckled even though the evaluation circuit 28 determines that the pretensioner should be actuated if the seat belt were buckled.

Figure 6:
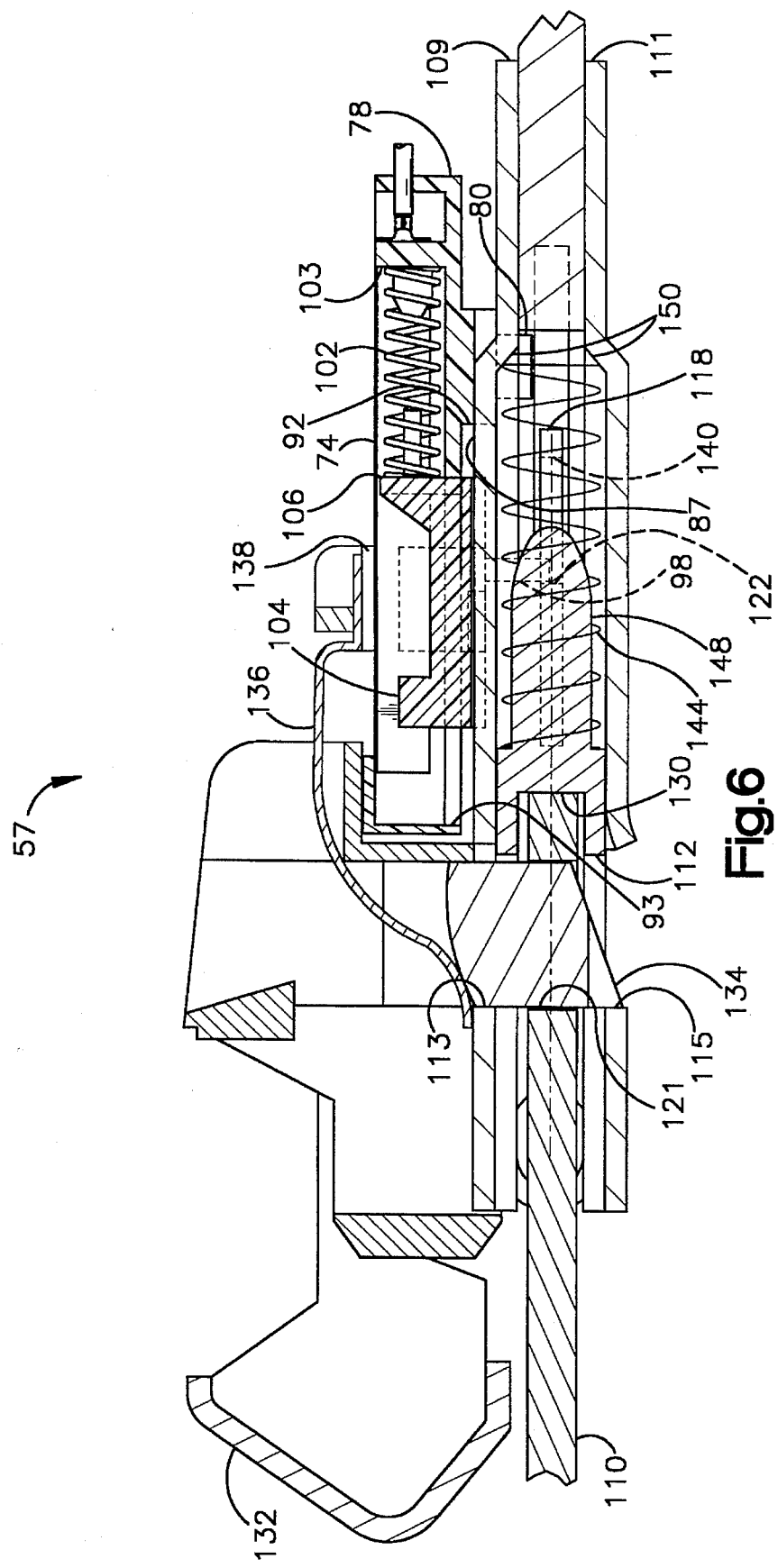
FIG. 6 is a view similar to FIG. 4, illustrating parts in different positions.

Referring to FIGS. 1, 5 and 6, when the seat belt is being buckled, the tongue 110 engages the receiving groove 130 of the ejector 112. As the tongue 110 is inserted into the seat belt base 108, the tongue 110 moves the ejector 112 against the bias of ejector spring 144 until the tongue 110 and the ejector 112 take the positions shown in FIGS. 5 and 6. The ejector 112 then does not block movement of the latch 134 through the latch openings 113, 115, and the tongue opening 121 is aligned with the latch openings 113, 115. The latch 134 moves in a downward direction under the bias of leaf spring 136, as viewed in FIG. 6, passing through the latch openings 113, 115 and tongue opening 121. Once the latch 134 passes through the openings, the seat belt tongue 110 is retained in the buckle 57 by the latch 134.

As the tongue is inserted into the buckle and moves the ejector 112, the slider engaging surfaces 122, 124 of the ejector 112 engage the ejector engaging tabs 98, 100 of the slider 84 and move the slider against the bias of the coil spring 102 to the position shown in FIGS. 5 and 6. In this position, the separator 104 is located between the electrical contacts 74, 76, thereby opening the switch 66. When the switch 66 is open, electrical current flows from the junction 54 through the resistor 60 and the resistor 72 to electrical ground. The voltage value $V_c$ at the junction 54 is functionally related to the resistance values of the resistors 60 and 72. The comparing and monitoring circuit 58 compares the voltage value $V_c$ to a reference voltage value. When $V_c$ is less than the reference voltage value, indicating that the switch 66 is open and the seat belt is buckled, a different control signal is provided to the evaluation circuit 28. The pretensioner actuation circuit 34 remains enabled, and the indicator 59 remains "OFF".

The comparing and monitoring circuit 58 also monitors the resistor network 60, 72 for an open circuit condition, e.g. an open circuit between (i) the junction 54 and the terminal 62, or (ii) the terminal 70 and electrical ground.

When an open circuit condition occurs, the voltage value at $V_c$ is approximately equal to the output voltage value of the bias voltage source 46. The comparing and monitoring circuit 58 compares the voltage value at the junction 54 with a reference voltage value. If the voltage value $V_c$ is greater than the reference voltage value, indicating an open circuit condition in the resistor network circuit, an open circuit control signal is provided to the evaluation circuit 28. Upon receiving the open circuit control signal, the evaluation circuit 28 keeps the pretensioner actuation circuit enabled. When the vehicle is involved in a collision that requires actuation of the pretensioner, the pretensioner is actuated even though a signal indicative of the seat belt being buckled is not received by the evaluation circuit 28.

In addition, upon the occurrence of a vehicle crash event, the comparing and monitoring circuit 58 provides signals indicative of the state of the seat belt buckle switch, i.e. switch open or closed, to the memory 61 for retrieval at a later time after the crash.

When the tongue 110 is to be released from the seat belt buckle, the occupant presses the push-button 132. The push-button 132 lifts the latch against the bias of spring 136. The ejector 112 then forces the tongue 110 out of the buckle. The ejector 112 and the latch 134 are then in their unbuckled positions.

When the ejector 112 returns to its unbuckled position, under the influence of ejector spring 144, the slider engaging tabs 122, 124 no longer engage the ejector engaging tabs 98, 100 of the slider 84. The bias spring 102 returns the slider 84 to the positions shown in FIGS. 2 and 4, thereby causing the contacts 74, 76 of switch 66 to close.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for restraining a vehicle occupant, said apparatus comprising:

a seat belt for extending across the vehicle occupant;

a tongue associated with said seat belt;

a buckle for receiving and latching said tongue in said buckle;

a seat belt buckle switch operatively connected to said buckle, said seat belt buckle switch having electrically conductive normally closed contacts;

a resistor network electrically connected to said normally closed contacts, said resistor network comprising a first resistor in series with said contacts and a second resistor in parallel with said contacts, said resistor network providing a first electrical signal having a first characteristic dependent upon the resistance value of said first resistor when said seat belt buckle switch is closed and a second electrical signal having a second characteristic dependent upon the resistance values of said first resistor and said second resistor when said seat belt buckle switch is open; and a controller operatively connected to said resistor network for monitoring said first and second signals.

2. The apparatus of claim 1 wherein said apparatus further includes a pretensioner operatively connected to said seat belt.

3. The apparatus of claim 1 further including indicator means for indicating if the tongue is received in said buckle.

4. The apparatus of claim 1 wherein the resistance value of said first resistor is about 100 ohms.

5. The apparatus of claim 1 wherein the resistance value of said second resistor is about 300 ohms.

6. The apparatus of claim 1 wherein said apparatus further comprises an inflatable air bag, and an actuatable inflator for providing a source of inflation fluid for inflating said air bag, said inflator is operatively connected to said controller, said controller controls actuation of said inflator.

7. The apparatus of claim 1 further including a memory for storing a value indicative of whether said tongue is received in said buckle, said memory being connected to said controller, said controller accesses the value.

8. A vehicle occupant restraint apparatus comprising:

an inflatable air bag;

an actuatable inflator for, upon actuation, providing inflation fluid for inflating said air bag;

a seat belt for extending across the vehicle occupant;

a tongue connected with said seat belt;

a buckle for receiving and latching said tongue in the buckle;

a pretensioner operatively connected to said seat belt;

an indicator for indicating if the tongue is received in said buckle;

a seat belt buckle switch operatively connected to said buckle, said seat belt buckle switch having electrically conductive normally closed contacts which open upon insertion of said tongue into said buckle;

a resistor network electrically connected to said normally closed contacts, said resistor network providing a first electrical signal having a first characteristic when said normally closed contacts are closed and a second electrical signal having a second characteristic when said normally closed contacts are open; and a controller operatively connected to said resistor network, said inflator, said pretensioner, and said indicator, said controller controlling actuation of said inflator, said pretensioner, and said indicator in accordance with said first and second electrical signals;

said resistor network comprising a first resistor in series with said contacts and a second resistor in parallel with said contacts, said resistor network providing the first electrical signal, when said normally closed contacts are closed, the first characteristic of the first electrical signal being dependent upon the resistance value of said first resistor, said resistor network providing the second electrical signal, when said normally closed contacts are open, the second characteristic of the second electrical signal being dependent upon the resistance values of said first resistor and said second resistor.

* * * * *